United States Patent
Wang (10) Patent No.: US 11,257,441 B2
(45) Date of Patent: Feb. 22, 2022

(54) METHOD AND DEVICE FOR CONTROLLING SCREEN BACKLIGHT, METHOD AND DEVICE FOR SETTING SCREEN BACKLIGHT, AND MULTI-SCREEN TERMINAL

(71) Applicant: XI'AN ZHONGXING NEW SOFTWARE CO., LTD, Shaanxi (CN)

(72) Inventor: Jianping Wang, Shenzhen (CN)

(73) Assignee: XI'AN ZHONGXING NEW SOFTWARE CO., LTD, Shaanxi (CN)

(*) Notice: Subject to any disclaimer, the term of this patent is extended or adjusted under 35 U.S.C. 154(b) by 0 days.

(21) Appl. No.: 16/639,975

(22) PCT Filed: May 14, 2018

(86) PCT No.: PCT/CN2018/086658
§ 371 (c)(1),
(2) Date: Feb. 18, 2020

(87) PCT Pub. No.: WO2019/033801
PCT Pub. Date: Feb. 21, 2019

(65) Prior Publication Data
US 2020/0193919 A1 Jun. 18, 2020

(30) Foreign Application Priority Data
Aug. 18, 2017 (CN) .......................... 201710715961.4

(51) Int. Cl.
*G09G 3/34* (2006.01)
*G09G 3/36* (2006.01)
*G09G 5/10* (2006.01)

(52) U.S. Cl.
CPC ............. *G09G 3/3413* (2013.01); *G09G 3/36* (2013.01); *G09G 5/10* (2013.01); *G09G 2320/0626* (2013.01)

(58) Field of Classification Search
CPC .......... G09G 3/3413; G09G 3/36; G09G 5/10; G09G 2320/0626
(Continued)

(56) References Cited

U.S. PATENT DOCUMENTS

2014/0104323 A1* 4/2014 Kenmochi ............... G09G 3/36
345/690

FOREIGN PATENT DOCUMENTS

| CM | 102857360 A | | 1/2013 |
|---|---|---|---|
| CN | 102136265 A | * | 7/2011 |

(Continued)

OTHER PUBLICATIONS

International Search Report and Written Opinion Form PCT/ISA/210 and PCT/ISA237, International Application No. PCT/CN2018/1086658pp. 1-9, International Filing Date May 14, 2018, mailing date of search report dated Aug. 9, 2018.
(Continued)

*Primary Examiner* — Mark Edwards
(74) *Attorney, Agent, or Firm* — Bond Schoeneck & King, PLLC; George McGuire (57) ABSTRACT

Disclosed is a method for controlling screen backlight, the method includes: determining a basic setting value V0, where the basic setting value V0 is a value set for backlight brightness of a first screen and backlight brightness of a second screen; calculating a setting value V1 of the backlight brightness of the first screen and a setting value V2 of the backlight brightness of the second screen respectively based on V0; and adjusting the backlight brightness of the first screen and the backlight brightness of the second screen according to V1 and V2 respectively. Further disclosed are a device for controlling screen backlight, a multi-screen terminal, a storage medium, a method and device for setting screen backlight, and a multi-screen terminal.

20 Claims, 5 Drawing Sheets

(58) Field of Classification Search
USPC .......................................................... 345/102
See application file for complete search history.

(56) References Cited

FOREIGN PATENT DOCUMENTS

| | | | |
|---|---|---|---|
| CN | 102136265 A | | 7/2011 |
| CN | 102376294 A | | 3/2012 |
| CN | 102857630 A | | 1/2013 |
| CN | 102903345 A | | 1/2013 |
| CN | 202871265 U | | 4/2013 |
| CN | 103597536 A | | 2/2014 |
| CN | 203492059 U | | 3/2014 |
| CN | 106155692 A | * | 11/2016 |
| CN | 106155692 A | | 11/2016 |
| CN | 106710565 A | | 5/2017 |
| CN | 107507579 A | | 12/2017 |
| JP | 2013156355 A | | 8/2013 |

OTHER PUBLICATIONS

Chinese Office Action, dated Aug. 15, 2019. pp. 1-15.

* cited by examiner

METHOD AND DEVICE FOR CONTROLLING SCREEN BACKLIGHT, METHOD AND DEVICE FOR SETTING SCREEN BACKLIGHT, AND MULTI-SCREEN TERMINAL

CROSS-REFERENCE TO RELATED APPLICATIONS

This is a National Stage Application, filed under 35 U.S.C. 371, of International Patent Application No. PCT/CN2018/086658, filed on May 14, 2018, which claims priority to Chinese patent application No. 201710715961.4 filed on Aug. 18, 2017, contents of both of which are incorporated herein by reference in their entireties.

TECHNICAL FIELD

The present disclosure relates to the field of display technologies, for example, to a method and device for controlling screen backlight, a method and device for setting screen backlight, and a multi-screen terminal.

BACKGROUND

At present, for a terminal, such as a mobile phone, when external light is relatively dim, an excessively bright screen will make people feel dazzling, and when the external light is relatively bright, an excessively dark screen will make a user unable to view a display picture of the mobile phone. Backlight adjustment may be used to improve the comfort level of human eyes while viewing the screen, and also to protect eyesight. There are two backlight adjustment manners when the terminal includes a single screen, one manner is that the terminal automatically adjusts backlight brightness of the screen according to a light intensity of an external environment detected by a light sensor. The backlight brightness of the screen will be reduced in an environment with relatively dim light, while the backlight brightness of the screen will be increased in an environment with relatively bright light. The other manner is to manually set the backlight brightness of the screen according to personal preference of the user. A setting value of the backlight brightness is generally taken within a certain integer interval, such as [1, 255]. In ideal cases, each setting value corresponds to one backlight brightness level, where 1 corresponds to lowest backlight brightness, and 255 corresponds to highest backlight brightness. The backlight brightness may be represented by a luminous flux displayed by screen backlight in the unit of lumens (lm).

In order to adapt to different requirements of different groups of people on smart terminal equipment, a double-screen terminal is designed, and each screen of the double-screen terminal corresponds to an independent backlight display unit. In a split-screen mode, two screens of the double-screen terminal may be used to display different contents, respectively. In a widescreen mode, the two screens of the double-screen terminal may spread and be used as one large screen. In the widescreen mode, the backlight brightness of the two screens needs to be as consistent as possible to obtain good experiences when the human eyes viewing the two screens.

In the related art, the double-screen terminal generally adopts one light sensor, in an automatic backlight adjustment mode, according to light intensity of the external environment collected by the light sensor, the setting value of the backlight brightness is calculated and set for the two screens, which is the same in both the widescreen mode and the split-screen mode. When the backlight adjustment is performed manually, setting values of backlight brightness gains of the two screens come from a manual input of the user on a same progress bar. In these two adjustment manners, the setting values of the backlight brightness of the two screens are the same at the same time, and it is impossible to adjust the backlight brightness of each screen respectively and it is difficult to achieve a user satisfactory display effect.

SUMMARY

The present disclosure provides a method and device for controlling screen backlight, a method and device for setting screen backlight, and a multi-screen terminal, to avoid a failure to adjust backlight brightness of each screen respectively and inconsistent backlight brightness of multiple screens.

The present application provides a method for controlling screen backlight. The method includes steps described below.

A basic setting value V0 is determined, where the basic setting value V0 is a value, which is set for backlight brightness of a first screen and backlight brightness of a second screen.

One or more corrections are performed based on the basic setting value V0 for each of the first screen and the second screen, a correction value of the backlight brightness of the first screen obtained by a last correction is served as a setting value V1 of the backlight brightness of the first screen, and a correction value of the backlight brightness of the second screen obtained by a last correction is served as a setting value V2 of the backlight brightness of the second screen.

The backlight brightness of the first screen is adjusted according to the setting value V1, and the backlight brightness of the second screen is adjusted according to the setting value V2.

The present application further provides a device for controlling screen backlight. The device includes a basic value determination module, a setting value determination module, and a brightness adjustment module.

The basic value determination module is configured to determine a basic setting value V0, where the basic setting value V0 is a value, which is set for backlight brightness of a first screen and backlight brightness of a second screen.

The setting value determination module is configured to perform one or more corrections based on the basic setting value V0 for each of the first screen and the second screen, serve a correction value of the backlight brightness of the first screen obtained by a last correction as a setting value V1 of the backlight brightness of the first screen, and serve a correction value of the backlight brightness of the second screen obtained by a last correction as a setting value V2 of the backlight brightness of the second screen.

The brightness adjustment module is configured to adjust the backlight brightness of the first screen according to the setting value V1, and adjust the backlight brightness of the second screen according to the setting value V2.

The present application further provides a multi-screen terminal, including a memory, a processor, and a computer program stored in the memory and executable on the processor, where the processor, when executing the computer program, implements the method for controlling screen backlight described above.

The present application further provides a computer-readable storage medium, which is configured to store a computer program which, when executed by a processor, implements the method for controlling screen backlight described above.

Control of screen backlight described above adjusts backlight brightness of two screens of a multi-screen terminal (including a double-screen terminal), respectively, which can improve a display effect.

The present application provides a method for setting screen backlight. The method includes steps described below.

A first control element configured to set a backlight brightness gain of a first screen and a second control element configured to set a backlight brightness gain of a second screen are displayed, where the first control element is different from the second control element.

A setting value of the backlight brightness gain of the first screen is determined and stored according to a detected user operation based on the first control element, and a setting value of the backlight brightness gain of the second screen is determined and stored according to a detected user operation based on the second control element.

The present application further provides a device for setting screen backlight. The device includes a display module and a setting module.

The display module is configured to display a first control element configured to set a backlight brightness gain of a first screen and a second control element configured to set a backlight brightness gain of a second screen, where the first control element is different from the second control element.

The setting module is configured to determine and store a setting value of the backlight brightness gain of the first screen according to a detected user operation based on the first control element, and determine and store a setting value of the backlight brightness gain of the second screen according to a detected user operation based on the second control element.

The present application further provides a multi-screen terminal, including a memory, a processor, and a computer program stored in the memory and executable on the processor, where the processor, when executing the computer program, implements the method for setting screen backlight described above.

Set of screen backlight described above may set backlight brightness gains of different screens respectively to satisfy individual requirements of a user.

DETAILED DESCRIPTION

Embodiment One

In an embodiment, backlight brightness of two screens of a double-screen terminal is either manually set or calculated based on a detection result of light of an external environment by a light sensor. Setting values of the backlight brightness of the two screens are the same at the same time. It is difficult to achieve a display effect desired by a user for reasons below. On one hand, even two screens of a same model from a same manufacturer have different backlight lumen characteristics. A backlight lumen characteristic of a screen refers to a correspondence between setting values of the backlight brightness inputted for the one screen (a value range may be, for example, [0-255]) and the backlight brightness displayed by the one screen (generally expressed in lumens), and it is unique for each screen. For example, when the inputted setting value of the backlight brightness is 50, the backlight brightness of one screen is 100 lux, and the backlight brightness of the other screen may be 120 lux. Therefore, although the setting values of the backlight brightness of the two screens are the same, the backlight brightness of the two screens is not the same, which affects the display effect.

Figure 1:
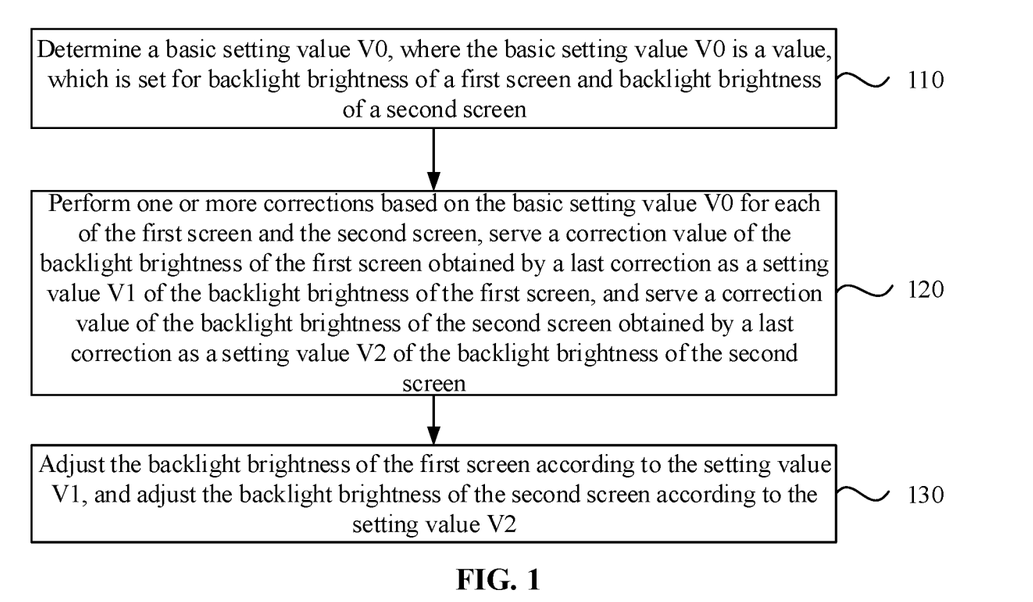
FIG. 1 is a flowchart of a method for controlling screen backlight according to embodiment one of the present application.

On the other hand, during long-term use of the screens of the double-screen terminal, a decrease of the screen brightness is inevitably caused by brightness losses. Generally, between the two screens, a main screen has longer use duration and larger brightness losses, and a secondary screen has shorter use duration and smaller brightness losses. Even if the setting values of the backlight brightness of the two screens are the same, the case where the main screen is darker than the secondary screen exists, resulting in poor user experiences. In addition, in the case of the double-screen display, considering power consumption and display effect, the user may want to decrease or increase a brightness value of one of the two screens respectively. Therefore, this embodiment provides a method for controlling screen backlight. As shown in FIG. 1, the method includes steps described below.

Step 110, a basic setting value V0 is determined. Herein, the basic setting value V0 is a value, which is set for backlight brightness of a first screen and backlight brightness of a second screen.

In this embodiment, a backlight control is performed on the two screens of the double-screen terminal, but the method may also be used for backlight control of a terminal with three or more screens, this terminal may perform a backlight control on the three or more screens at the same time, as long as the backlight control of two screens among the three or more screens uses the method of this embodiment, which also belongs to an example of the method of this embodiment. Both the two screens of the double-screen terminal in this embodiment are liquid crystal displays (LCDs), but the present application is not limited thereto. The screens may be any type of display screens with backlight.

In the present application, a basic setting value of the backlight brightness of the first screen and a basic setting value of the backlight brightness of the second screen are a value commonly set for the two screens by the double-screen terminal, which may be manually set, or calculated according to a detection result of the light of the external environment by the light sensor, or obtained in other manners.

Step 120, the double-screen terminal performs one or more corrections based on the basic setting value V0 for each of the first screen and the second screen, serves a correction value of the backlight brightness of the first screen obtained by a last correction as a setting value V1 of the backlight brightness of the first screen, and serves a correction value of the backlight brightness of the second screen obtained by a last correction as a setting value V2 of the backlight brightness of the second screen.

In this embodiment, performing the one or more corrections based on the basic setting value V0 for each of the first screen and the second screen includes performing a first correction on each of the first screen and the second screen based on the basic setting value V0. The first correction may be performed on each of the first screen and the second screen based on the basic setting value V0 in correction manner one described below. A correction value V1c and a correction value V2c are calculated according to the basic setting value V0, a backlight lumen characteristic of the first screen, and a backlight lumen characteristic of the second screen, such that the backlight brightness of the first screen when a setting value of the backlight brightness of the first screen is the correction value V1c is consistent with the backlight brightness of the second screen when a setting value of the backlight brightness of the second screen is the correction value V2c. Herein, the correction value V1c is a correction value of the backlight brightness of the first screen after the first correction, and the correction value V2c is a correction value of the backlight brightness of the second screen after the first correction.

In an embodiment, the step in which the correction value V1c and the correction value V2c are calculated according to the basic setting value V0, the backlight lumen characteristic of the first screen, and the backlight lumen characteristic of the second screen includes one of steps described below.

The basic setting value V0 is served as the correction value V1c, the backlight brightness of the first screen corresponding to the basic setting value V0 is determined according to the backlight lumen characteristic of the first screen, and a setting value of the backlight brightness of the second screen corresponding to the backlight brightness of the first screen is served as the correction value V2c according to the backlight lumen characteristic of the second screen.

The basic setting value V0 is served as the correction value V2c, the backlight brightness of the second screen corresponding to the basic setting value V0 is determined according to the backlight lumen characteristic of the second screen, and a setting value of the backlight brightness of the first screen corresponding to the backlight brightness of the second screen is served as the correction value V1c according to the backlight lumen characteristic of the first screen.

Backlight brightness of a standard screen corresponding to the basic setting value V0 is determined according to a backlight lumen characteristic of the standard screen, a setting value of the backlight brightness of the first screen corresponding to the backlight brightness of the standard screen is served as the correction value V1c according to the backlight lumen characteristic of the first screen, and a setting value of the backlight brightness of the second screen corresponding to the backlight brightness of the standard screen is served as the correction value V2c according to the backlight lumen characteristic of the second screen.

In correction manner one, lumen values of the backlight brightness practically displayed by the two screens may be as consistent as possible through a brightness calibration algorithm to improve the user experience.

Two correction manners described below may be used for the first correction or a subsequent correction.

In correction manner two, the step in which the first correction is performed on each of the first screen and the second screen based on the basic setting value V0 includes steps described below.

According to at least use duration T1 of the first screen and use duration T2 of the second screen, a loss difference $\Delta v$ between the backlight brightness of the first screen and the backlight brightness of the second screen as $\Delta v=\Delta v1-\Delta v2$ is determined. Herein, $\Delta v1$ is a loss value of the backlight brightness of the first screen, and $\Delta v2$ is a loss value of the backlight brightness of the second screen.

A correction value V1r of the backlight brightness of the first screen and a correction value V2r of the backlight brightness of the second screen are calculated, such that $V1r-V2r=V0+\Delta v-V0$, where V0 is the basic setting value.

After the first correction is performed on each of the first screen and the second screen based on the basic setting value V0, the method further includes a step described below. One or more corrections are performed on each of the first screen and the second screen.

The step in which the one or more corrections are performed on the first screen and the second screen includes steps described below.

According to the use duration T1 of the first screen and the use duration T2 of the second screen, the loss difference $\Delta v$ between the backlight brightness of the first screen and the backlight brightness of the second screen as $\Delta v=\Delta v1-\Delta v2$ is determined, where $\Delta v1$ is the loss value of the backlight brightness of the first screen, and $\Delta v2$ is the loss value of the backlight brightness of the second screen. In an embodiment, after the first correction is performed on each of the first screen and the second screen, this step may be omitted while subsequent corrections are performed, that is, the step in which the loss difference between the backlight brightness of the first screen and the backlight brightness of the second screen according to the use duration T1 of the first screen and the use duration T2 of the second screen is determined may be omitted.

A correction value V1r' of the backlight brightness of the first screen and a correction value V2r' of the backlight brightness of the second screen are calculated such that $V1r'-V2r'=V1pre+\Delta v-V2pre$, where V1pre is a correction value of the backlight brightness of the first screen after a previous correction, and V2pre is a correction value of the backlight brightness of the second screen after the previous correction. That is, V1pre is a value taken from an interval of [V1pre, V1pre+$\Delta v$] according to a preset rule, when this correction is not the first correction, V1pre is the correction value of the backlight brightness of the first screen after the previous correction and V2pre is the correction value of the backlight brightness of the second screen after the previous correction, when the first correction is performed on the first screen and the second screen, V1pre and V2pre are both the basic setting value V0.

In the present application, Δv1 and Δv2 use a same unit as the setting values of the backlight brightness, and Δv1 and Δv2 are represented by positive numbers. In other embodiments, they may be represented by negative numbers, which are equivalent. In correction manner two, the setting value of the backlight brightness of the screen with larger brightness losses is increased to compensate for the loss difference between the two screens.

Correction Manner Three

The step in which the first correction is performed on the first screen and the second screen based on the basic setting value V0 includes steps described below.

v1 is added to the basic setting value V0 to obtain a correction value of the backlight brightness of the first screen, and v2 is added to the basic setting value V0 to obtain a correction value of the backlight brightness of the second screen.

Herein, v1 is a backlight brightness gain of the first screen, v2 is a backlight brightness gain of the second screen, and v1 and v2 are set according to a user operation.

After the first correction is performed on the first screen and the second screen based on the basic setting value V0, the method further includes a step described below. One or more corrections are performed on each of the first screen and the second screen.

The step in which the one or more corrections are performed on each of the first screen and the second screen includes steps described below.

v1 is added to a correction value V1pre' to obtain a correction value of the backlight brightness of the first screen, and v2 is added to a correction value V2pre' to obtain a correction value of the backlight brightness of the second screen; where v1 is the backlight brightness gain of the first screen, v2 is the backlight brightness gain of the second screen, and v1 and v2 are set according to the user operation; V1pre' is a correction value of the backlight brightness of the first screen after a previous correction, and V2pre' is a correction value of the backlight brightness of the second screen after the previous correction. That is, when this correction is not the first correction, V1pre' is the correction value of the backlight brightness of the first screen after the previous correction and V2pre' is the correction value of the backlight brightness of the second screen after the previous correction. When the first correction is performed on each of the first screen and the second screen, V1pre' and V2pre' are both the basic setting value V0.

In correction manner three, for the user individual requirements, the backlight brightness gains set by a user for the two screens are respectively stored as user preference.

Step 130, the backlight brightness of the first screen is adjusted according to the setting value V1, and the backlight brightness of the second screen is adjusted according to the setting value V2.

In this step, V1 may be inputted into a backlight control unit of the first screen, and V2 may be inputted into a backlight control unit of the second screen. For example, the backlight control unit is a backlight chip, and the backlight control unit performs backlight display according to the inputted setting value, so as to adjust the backlight brightness of the first screen and the backlight brightness of the second screen.

In one example, the basic setting value of the backlight brightness calculated according to an automatic backlight adjustment method (or manually inputted) is 125, and the loss difference Δv of the backlight brightness of the first screen and the second screen is calculated as 25 according to correction manner two in this embodiment, it is assumed that the first screen is the main screen with larger losses, after the backlight brightness of the first screen and the backlight brightness of the second screen are adjusted based on the basic setting value V0, respectively, the setting value of the backlight brightness of the first screen is determined to be 150, and the setting value of the backlight brightness of the second screen is determined to be 125. Alternatively, according to correction manner three in this embodiment, the user sets the brightness gain of the first screen as 25 and the brightness gain of the second screen as 0, and after the backlight brightness of the first screen and the backlight brightness of the second screen are adjusted based on the basic setting value V0, respectively, the setting value of the backlight brightness of the first screen is determined to be 150, and the setting value of the backlight brightness of the second screen is determined to be 125.

The above-mentioned various correction manners may be used in various combinations. For example, based on brightness calibration of correction manner one, after original data of the backlight lumen characteristic of the first screen and the backlight lumen characteristic of the second screen is measured in a factory, the data is stored in a mobile phone. The brightness calibration of correction manner one is turned on by default, so that the brightness of the two screens is the same after the user gets the mobile phone. On this basis, correction manner three is used, the user may manually set the brightness gain of the first screen and the brightness gain of the second screen, respectively, so that the brightness of the two screens is different to meet individual requirements. The manual setting of the brightness gains may be cancelled and the brightness of the two screens is restored to brightness values calibrated at the factory. Loss compensation in manner two may not be turned on by default. When losses of the lumen value reach a certain threshold, such as 10 lux, the loss compensation is automatically turned on, or, the user is prompted and the loss compensation is turned on when the user confirmation is obtained.

Figure 2:
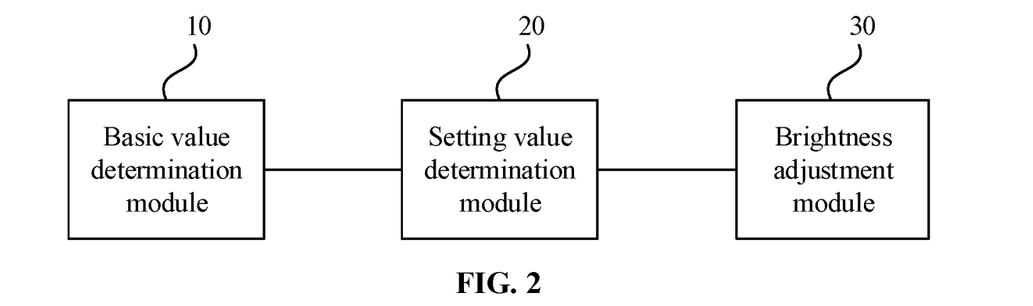
FIG. 2 is a diagram illustrating modules of a device for controlling screen backlight according to embodiment one of the present application.

This embodiment further provides a device for controlling screen backlight. As shown in FIG. 2, the device includes a basic value determination module 10, a setting value determination module 20, and a brightness adjustment module 30.

The basic value determination module 10 is configured to determine a basic setting value V0, where the basic setting value V0 is a value, which is set for backlight brightness of a first screen and backlight brightness of a second screen.

The setting value determination module 20 is configured to perform one or more corrections based on the basic setting value V0 for each of the first screen and the second screen, serve a correction value of the backlight brightness of the first screen obtained by a last correction as a setting value V1 of the backlight brightness of the first screen, and serve a correction value of the backlight brightness of the second screen obtained by a last correction as a setting value V2 of the backlight brightness of the second screen.

The brightness adjustment module 30 is configured to adjust the backlight brightness of the first screen according to the setting value V1, and adjust the backlight brightness of the second screen according to the setting value V2.

In an embodiment, the setting value determination module is configured to perform a first correction on each of the first screen and the second screen based on the basic setting value V0 in a manner described below.

A correction value V1c and a correction value V2c are calculated according to the basic setting value V0, a backlight lumen characteristic of the first screen, and a backlight lumen characteristic of the second screen, such that the backlight brightness of the first screen when a setting value of the backlight brightness of the first screen is the correction value V1c is consistent with the backlight brightness of the second screen when a setting value of the backlight brightness of the second screen is the correction value V2c, where the correction value V1c is a correction value of the backlight brightness of the first screen after the first correction, and the correction value V2c is a correction value of the backlight brightness of the second screen after the first correction.

In an embodiment, the setting value determination module is configured to perform a first correction on each of the first screen and the second screen based on the basic setting value V0 in a manner described below.

According to use duration T1 of the first screen and use duration T2 of the second screen, a loss difference $\Delta v$ between the backlight brightness of the first screen and the backlight brightness of the second screen as $\Delta v = \Delta v1 - \Delta v2$ is determined, where $\Delta v1$ is a loss value of the backlight brightness of the first screen, and $\Delta v2$ is a loss value of the backlight brightness of the second screen.

A correction value V1r of the backlight brightness of the first screen and a correction value V2r of the backlight brightness of the second screen are calculated, such that $V1r - V2r = V0 + \Delta v - V0$.

After the first correction is performed on each of the first screen and the second screen based on the basic setting value V0, the setting value determination module is configured to perform one or more corrections on each of the first screen and the second screen in a manner described below.

According to the use duration T1 of the first screen and the use duration T2 of the second screen, the loss difference $\Delta v$ between the backlight brightness of the first screen and the backlight brightness of the second screen as $\Delta v = \Delta v1 - \Delta v2$ is determined, where $\Delta v1$ is the loss value of the backlight brightness of the first screen, and $\Delta v2$ is the loss value of the backlight brightness of the second screen.

A correction value V1r' of the backlight brightness of the first screen and a correction value V2r' of the backlight brightness of the second screen are calculated such that $V1r' - V2r' = V1pre + \Delta v - V2pre$, where V1pre is a correction value of the backlight brightness of the first screen after a previous correction, and V2pre is a correction value of the backlight brightness of the second screen after the previous correction.

The setting value determination module may use correction manners as described in the above-mentioned method, which will not be repeated here.

This embodiment further provides a multi-screen terminal, including a memory, a processor, and a computer program stored in the memory and executable on the processor, where the processor, when executing the computer program, implements any processing of the method according to this embodiment.

This embodiment further provides a computer-readable storage medium, which is configured to store a computer program, when the computer program is executed by a processor, the computer program implements any processing of the method according to this embodiment.

This embodiment adjusts the backlight brightness of the two screens of the double-screen terminal respectively, which can improve the display effect.

Embodiment Two

In this embodiment, for differences between backlight lumen characteristics of double screens in embodiment one, using an adjustment manner with a brightness calibration algorithm to perform adjustment will be described below by way of example.

In this embodiment, backlight lumen characteristics of two screens of a double-screen terminal are used as original data. The backlight lumen characteristics may be represented by backlight lumen curves shown in FIG. 3, where the abscissa denotes a setting value of screen backlight brightness, and the ordinate denotes the screen backlight brightness. Between two curves in FIG. 3, the lower one is a backlight lumen characteristic curve of a first screen, LCD1, and the upper one is a backlight lumen characteristic curve of a second screen, LCD2. For LCD1 and LCD2, a lumen value of the backlight brightness corresponding to the setting value of the backlight brightness (multiple values may be selected from 1 to 255) may be measured by an illuminometer or other instruments.

Figure 3:
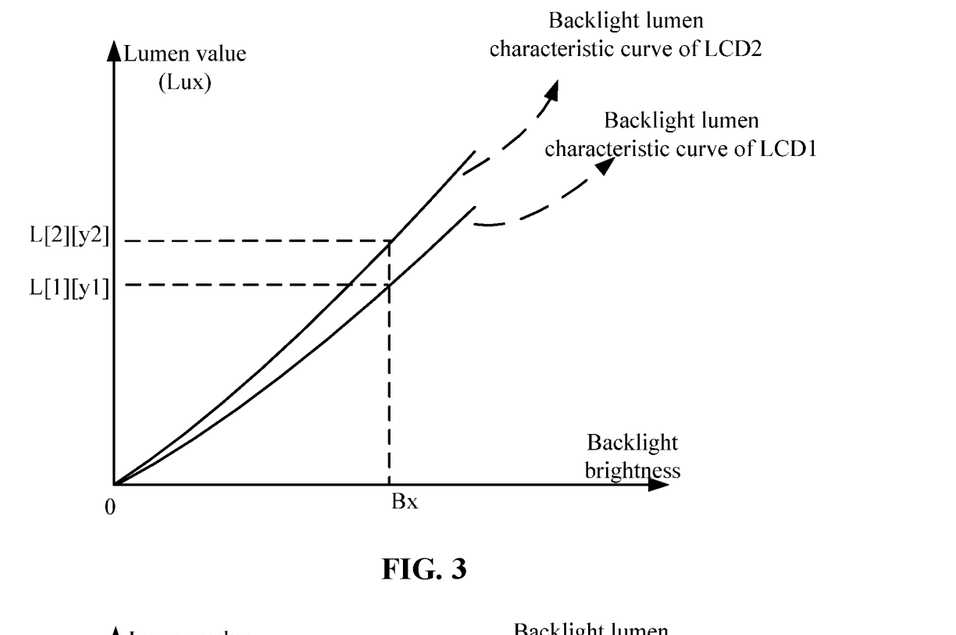
FIG. 3 is a schematic diagram of a backlight lumen characteristic curve according to embodiment two of the present application.

Referring to FIG. 3, if the double-screen terminal determines a basic setting value of the backlight brightness for LCD1 and LCD2 to be Bx, the lumen value of the backlight brightness corresponding to Bx in the backlight lumen characteristic of LCD1 is L[1][y1], the lumen value of the backlight brightness corresponding to Bx in the backlight lumen characteristic of LCD2 is L[2][y2], the backlight brightness of the two screens has a difference of $\Delta = L[2][y2] - L[1][y1]$, which has a poor display effect.

Three schemes are described below to make the backlight brightness of the two screens as consistent as possible through the brightness calibration algorithm.

Figure 4:
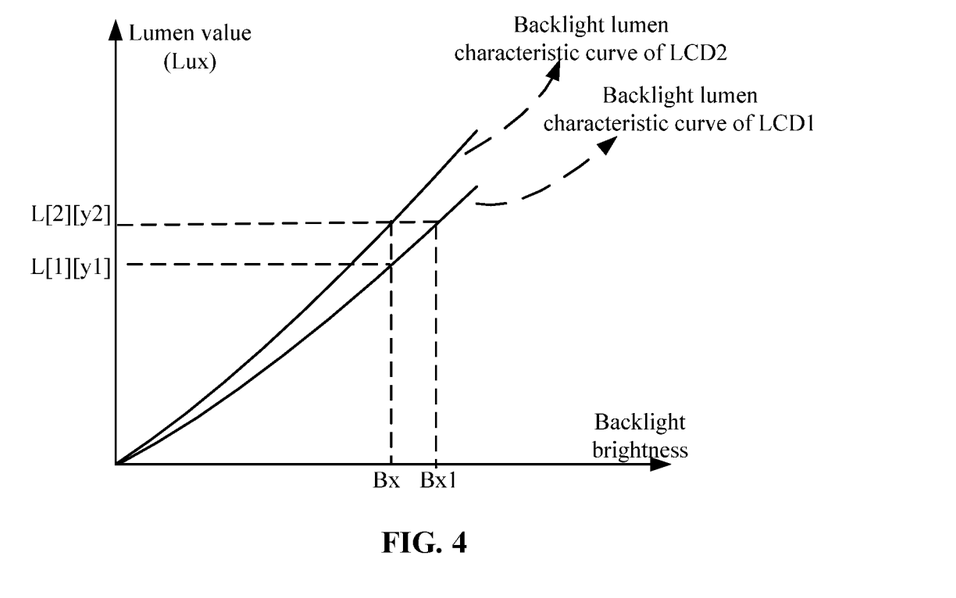
FIG. 4 is a schematic diagram of an example of double-screen brightness fitting according to a backlight lumen characteristic curve in embodiment two of the present application.

Scheme one: Fitting is performed according to the screen with the upper brightness curve, and the backlight brightness of LCD1 is fitted to the backlight brightness of LCD2. Referring to FIG. 4, the lumen value of the backlight brightness corresponding to Bx in the backlight lumen characteristic of LCD2 is L[2][y2], the backlight lumen characteristic curve of LCD1 is looked up through L[2][y2], and a backlight setting value (that is, the setting value of the backlight brightness) corresponding to the lumen value L[2][y2] is located to be Bx1, so that Bx1 is inputted into a backlight chip of LCD1 as the setting value of the backlight brightness of LCD1, and Bx is inputted into a backlight chip of LCD2 as the setting value of the backlight brightness of LCD2. After adjustment, the backlight brightness of the two screens is consistent, which is L[2][y2].

Figure 5:
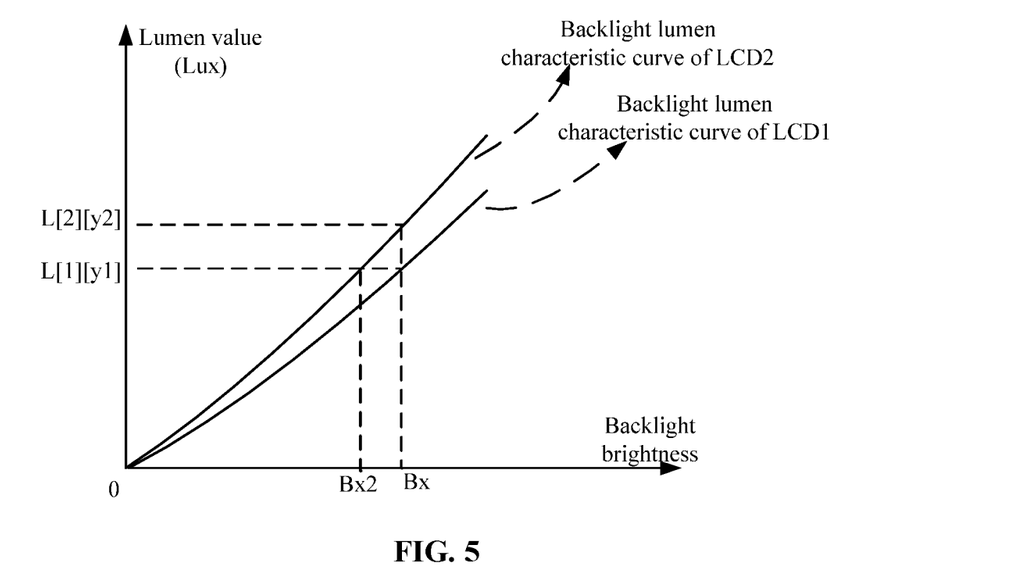
FIG. 5 is a schematic diagram of another example of double-screen brightness fitting according to a backlight lumen characteristic curve in embodiment two of the present application.

Scheme two: Fitting is performed according to the screen with the lower brightness curve, and the backlight brightness of LCD2 is fitted to the backlight brightness of LCD1. Referring to FIG. 5, the lumen value of the backlight brightness corresponding to Bx in the backlight lumen characteristic of LCD1 is L[1][y1], the backlight lumen characteristic curve of LCD2 is looked up through L[1][y1], and the setting value of the backlight brightness corresponding to the lumen value L[1][y1] is located to be Bx2, so that Bx2 is inputted into the backlight chip of LCD2 as the setting value of the backlight brightness of LCD2, and Bx is inputted into the backlight chip of LCD1 as the setting value of the backlight brightness of LCD1. After adjustment, the brightness displayed by the two screens is consistent, which is L[1][y1].

Figure 6:
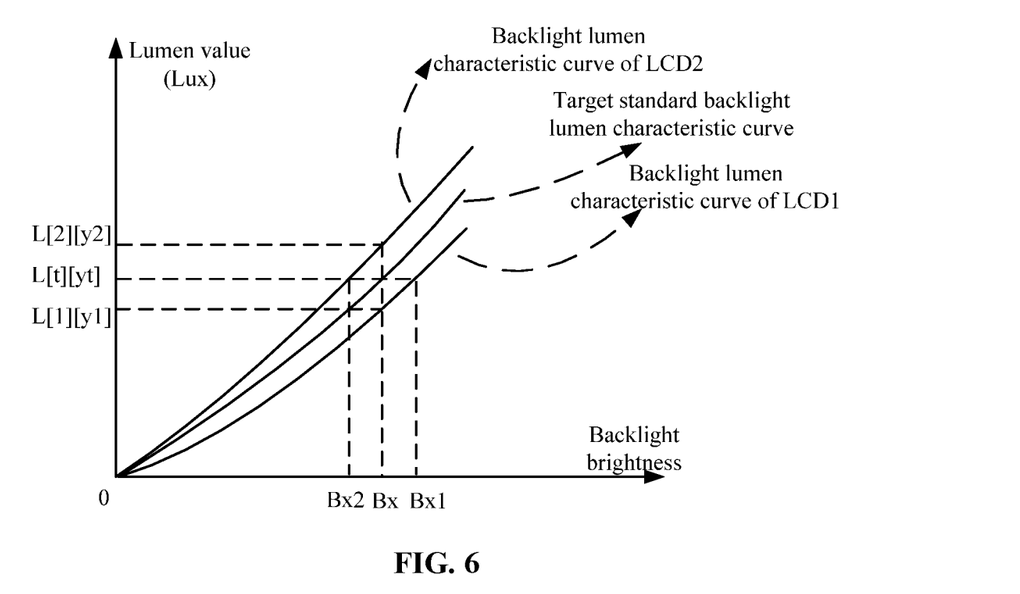
FIG. 6 is a schematic diagram of another example of double-screen brightness fitting according to a backlight lumen characteristic curve in embodiment two of the present application.

Scheme three: Fitting is performed according to a backlight lumen characteristic curve of a standard screen, that is, both the backlight brightness of LCD1 and the backlight brightness of LCD2 are fitted to backlight brightness of the standard screen. A backlight lumen characteristic of the standard screen may be pre-configured. Referring to FIG. 6, through Bx a lumen value corresponding to the backlight lumen characteristic curve of the standard screen is located to be L[t][yt]; the backlight lumen characteristic curve of LCD1 is looked up through L[t][yt], the setting value of the backlight brightness corresponding to the lumen value L[t][yt] is located to be Bx1, and Bx1 is inputted into the backlight chip of LCD1 as the setting value of the backlight brightness of LCD1; the backlight lumen characteristic curve of LCD2 is looked up through L[t][yt], the setting value of the backlight brightness corresponding to the lumen value L[t][yt] is located to be Bx2, and Bx2 is inputted into the backlight chip of LCD2 as the setting value of the backlight brightness of LCD2. After adjustment, the brightness displayed by the two screens is consistent, which is L[t][yt].

Scheme one and scheme two can make the backlight brightness of the two screens of the double-screen terminal to be consistent, and scheme three can further make backlight brightness of different terminals in a same batch to be consistent when the setting values of the different terminals are the same.

In an embodiment, the schemes in this embodiment merely perform a correction through brightness calibration, so correction values after the brightness calibration are inputted as setting values into the backlight chips, respectively. In other embodiments, based on the correction values obtained by the brightness calibration, corrections may also be continued in other correction manners.

Embodiment Three

In this embodiment, for a loss difference of backlight brightness between double screens in embodiment one, using a correction manner of loss difference compensation to perform adjustment will be described by below way of example.

This embodiment assumes that a correction of the loss difference compensation is performed based on a basic setting value of the backlight brightness, that is, a first correction. However, in another embodiment, the correction of the loss difference compensation may also be performed based on correction values obtained by performing a correction in a brightness calibration manner according to embodiment two. At this time, for a basic setting value used for calculations, when a correction calculation of a first screen is performed, the basic setting value should be modified as a correction value of backlight brightness of the first screen after the brightness calibration, and when a correction calculation of a second screen is performed, the basic setting value should be modified as a correction value of backlight brightness of the second screen after the brightness calibration.

A backlight control method according to this embodiment includes following processing.

The first screen and the second screen are started.

A loss value $\Delta v1$ of the backlight brightness of the first screen and a loss value $\Delta v2$ of the backlight brightness of the second screen are calculated, and a loss difference $\Delta v$ between the backlight brightness of the first screen and the backlight brightness of the second screen as $\Delta v = \Delta v1 - \Delta v2$ is calculated.

The basic setting value V0 of backlight displayed by the first screen and the second screen is obtained by manually adjusting or automatically adjusting overall backlight brightness. According to V0 and $\Delta v$, a setting value V1 of the backlight brightness of the first screen and a setting value V2 of the backlight brightness of the second screen are calculated respectively, such that a difference of V1 minus V2 is $\Delta v$, where V1 is taken from an interval of [V0, V0+$\Delta v$].

The obtained V1 and V2 are inputted into a backlight control unit of the first screen and a backlight control unit of the second screen, respectively.

Here an exemplary method for calculating the loss value $\Delta v1$ of the backlight brightness of the first screen and the loss value $\Delta v2$ of the backlight brightness of the second screen is provided.

The first screen is taken as an example, use duration Xt1 of the first screen and a weighted average value PWB1 of the backlight brightness of the first screen are calculated according to use duration and a setting value of the backlight brightness of the first screen in each operation, where $Xt1 = wt1 + wt2 + \ldots + wtn$; and $PWB1 = (wt1*wb1 + wt2*wb2 + \ldots + wtn*wbn)/Xt1$;

where wt1, wt2, ..., wtn are operation duration of each operation of the first screen, respectively, and wb1, wb2, wbn are setting values of the backlight brightness in each operation of the first screen. When the setting value of the backlight brightness changes during a time-continuous operation, the time-continuous operation is regarded as multiple operations, that is, each setting value of the backlight brightness corresponds to one operation, and the setting value and the corresponding operation duration are recorded respectively.

Then, in this example, the loss value $\Delta v1$ of the backlight brightness of the first screen when the backlight brightness is set to PWB1 and the use duration is Xt1 is calculated according to a correspondence between use duration and a brightness loss of the screen under one or more operation backlight brightness settings. The operation backlight brightness here is obtained through weighted average fitting according to corresponding operation duration of the screen under different operation brightness. In an embodiment, a loss curve for maximum brightness and a loss curve for half operation brightness are fitted to obtain a backlight loss curve under the operation backlight brightness and further a backlight loss value under the operation backlight brightness is obtained through calculation.

Figure 7:
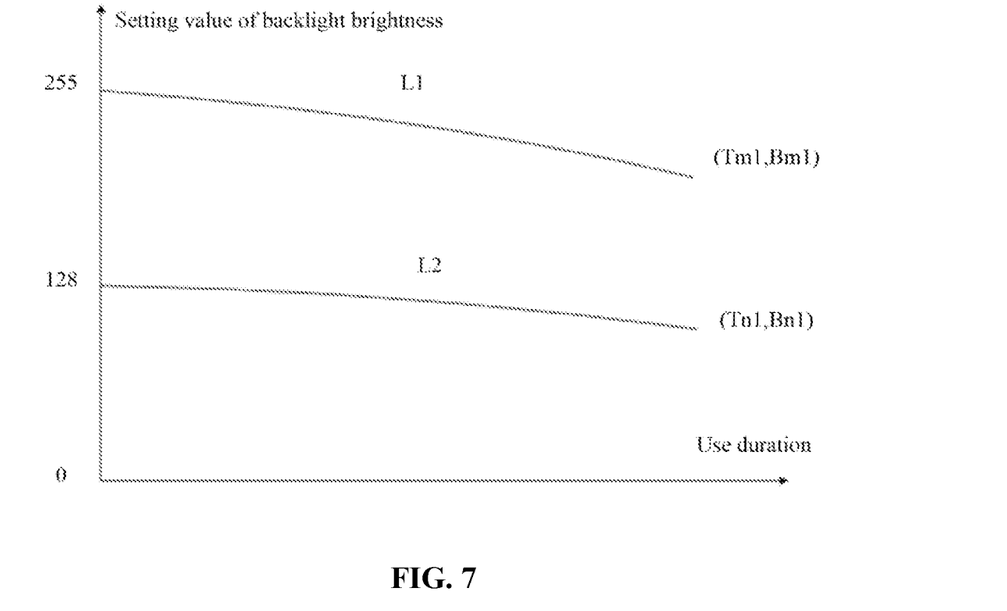
FIG. 7 is a schematic diagram of a backlight brightness loss curve according to embodiment three of the present application.

The correspondence between the use duration and the brightness loss of the screen may be represented by a backlight brightness loss curve shown in FIG. 7, in which the abscissa denotes the use duration and the ordinate denotes setting values from 1 to 255. Brightness loss curves of the first screen and the second screen may use brightness loss curves obtained by experiments using a same type of screens as the first screen and the second screen.

The brightness loss curve of the first screen shown in FIG. 7 is divided into a backlight brightness loss curve L1 when the setting value of the backlight brightness is a maximum value (the first screen always operates under maximum brightness, and 255 is used as an example in the figure) and a backlight brightness loss curve L2 when the setting value of the backlight brightness is half of the maximum value (the first screen always operates under half brightness, and 128 is used as an example in the figure).

The backlight brightness loss curves in the figure are approximately to be linear lines, and then $$Ybm = \frac{B_m - 255}{T_m} \cdot Xtl + 255; \text{ and} \quad (1)$$

$$Ybn = \frac{B_n - 128}{T_n} \cdot Xtl + 128 \quad (2)$$

where Tm denotes use duration under the maximum brightness, and Bm denotes a brightness loss value after an operation of Tm under the maximum brightness. According to formula (1), the corresponding brightness loss value Ybm under the maximum brightness when the use duration is Xt1 may be obtained.

Where Tn denotes use duration under the half brightness, and Bn denotes a brightness loss value after an operation of Tn under the half brightness. According to formula (2), the corresponding brightness loss value Ybn under the half brightness when the use duration is Xt1 may be obtained.

Figure 8:
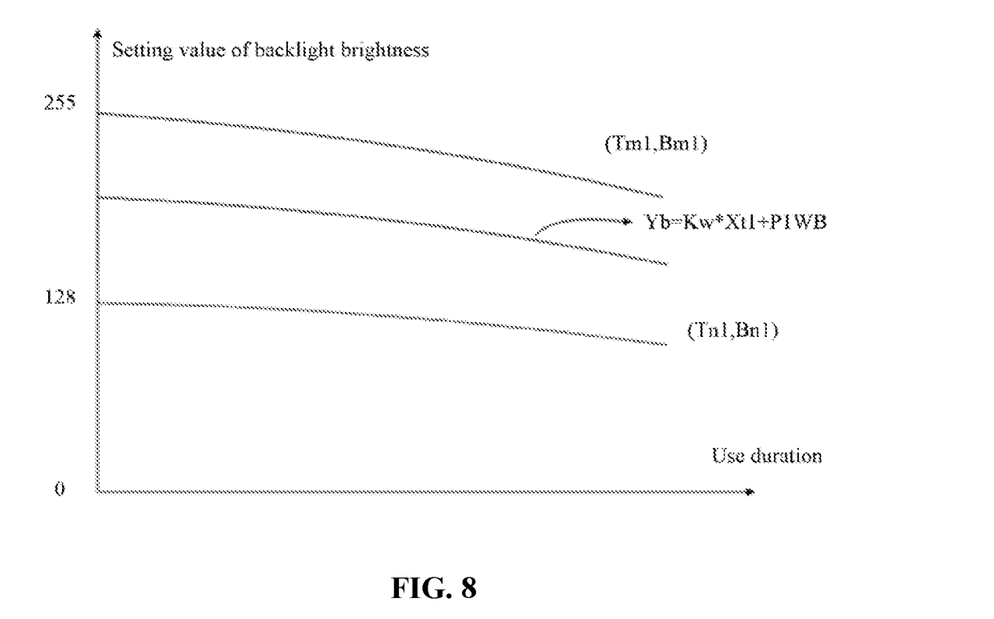
FIG. 8 is a schematic diagram of fitting according to the backlight brightness loss curve in FIG. 7 in embodiment three of the present application.

Through function fitting, a loss curve of the screen when operating under weighted average operation brightness P1WT may be obtained, as shown in FIG. 8, and it is expressed by the following formula:

$$\Delta v1 = Kw * Xt1 + P1WB \quad (3)$$

where Kw is calculated in a following manner:

when $128 < P1WB \leq 255$, $$Kw = \frac{P1WB - 128}{255 - 128} \cdot \frac{B_m - 255}{Tm} + \frac{255 - P1WB}{255 - 128} \cdot \frac{B_n - 128}{Tn} \quad (1)$$

when $0 < P1WB \leq 128$, $$Kw = \frac{P1WB}{128} \cdot \frac{B_n - 128}{Tn} \quad (5)$$

Through formula (3), a brightness loss value Yb under the weighted average operation brightness P1WT when the use duration is Xt1 may be obtained.

Similarly, use duration Xt2, weighted average operation brightness P2WB, and a current brightness loss value Δv2 of the second screen may be obtained.

In this embodiment, the brightness loss value corresponding to the use duration of the screen under any weighted average operation brightness is fitted by using curves for representing brightness losses corresponding to the use duration of the screen under two operation backlight brightness settings. It may be understand that in another embodiment, the brightness loss value corresponding to the use duration of the screen under any weighted average operation brightness is fitted by using curves for representing brightness losses corresponding to the use duration of the screen under more operation backlight brightness settings, which has higher accuracy. In another embodiment, the backlight brightness may be ignored, the correspondence between the use duration of screen backlight and the brightness loss may be obtained according to historical data statistics, which can also achieve a compensation effect though it is rough, and has simpler calculations.

Figure 9:
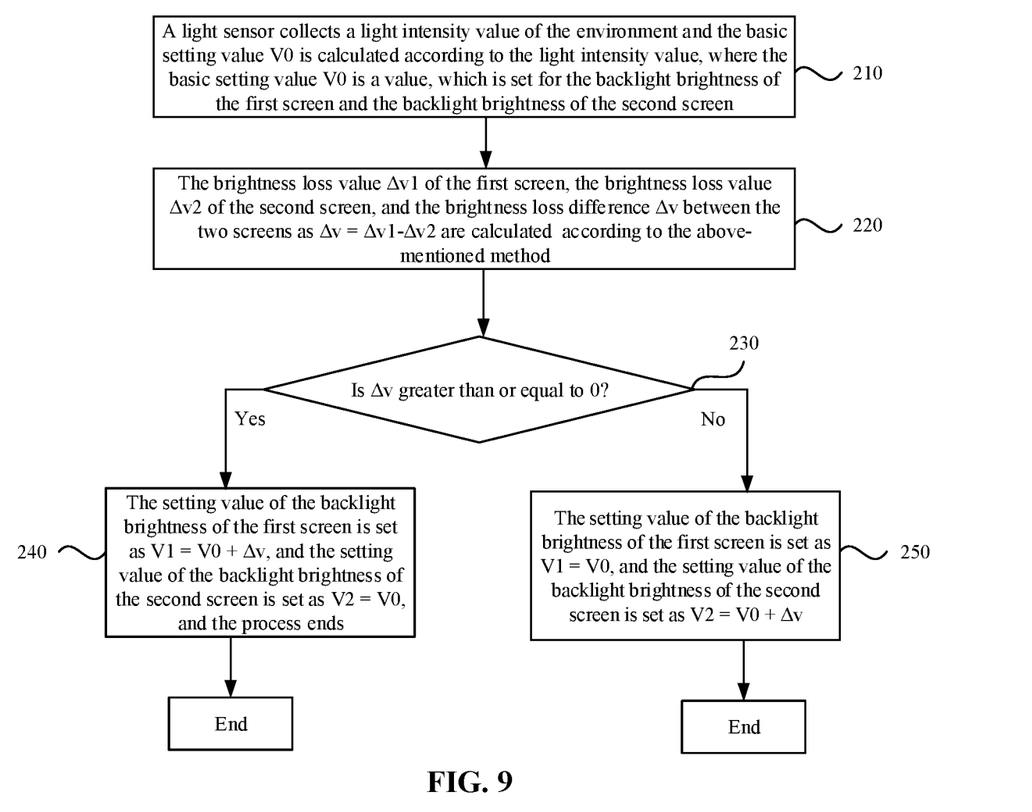
FIG. 9 is a flowchart of a method for controlling screen backlight according to embodiment three of the present application.

An example of a process of this embodiment is shown in FIG. 9 and the process includes steps described below.

Step 210, a light sensor collects a light intensity value of the environment and the basic setting value V0 is calculated according to the light intensity value, where the basic setting value V0 is a value, which is set for the backlight brightness of the first screen and the backlight brightness of the second screen.

Step 220, a brightness loss value Δv1 of the first screen, a brightness loss value Δv2 of the second screen, and a brightness loss difference Δv between the two screens as Δv=Δv1−Δv2 are calculated according to the above-mentioned method.

The brightness loss value Δv1 and the brightness loss value Δv2 of the second screen are positive values, that is, the more the brightness loss, the larger the value.

Step 230, it is determined whether Δv is greater than or equal to 0. If Δv is greater than or equal to 0, step 240 is executed, if Δv is less than 0, step 250 is executed.

Step 240, the setting value of the backlight brightness of the first screen is set as V1=V0+Δv, and the setting value of the backlight brightness of the second screen is set as V2=V0. The process ends.

Step 250, the setting value of the backlight brightness of the first screen is set as V1=V0, and the setting value of the backlight brightness of the second screen is set as V2=V0+Δv. The process ends.

The processing in steps 240 and 250 is to increase the setting value of brightness of the screen with more losses based on the basic setting value V0, so that the brightness of the two screens is unified to the brightness of the screen with less losses. During the long-term use of screens of a double-screen terminal, it is inevitable that a main screen is used for more time and has more backlight brightness losses and lower brightness. A same setting value will cause the main screen to be darker than a secondary screen. The scheme in this embodiment can make the backlight brightness of two screens in a widescreen mode to be the same, and improve user experience.

According to the above-mentioned embodiments, the backlight brightness of the first screen and the backlight brightness of the second screen may be adjusted respectively to obtain different setting values, which are not limited to a common setting value. If manner one and/or manner two described above are/is used for adjustment and a same basic setting value of backlight brightness is inputted for the two screens, after respective adjustment, the setting value of the backlight brightness of one screen or two screens may be different from the basic setting value, and it may be detected by an illuminometer, or etc. that a difference exists between the detected backlight brightness of the one screen or the two screens and backlight brightness corresponding to the basic setting value (obtained according to the backlight lumen characteristics of the screens), this difference can compensate a difference between characteristics and/or a difference due to losses of the two screens.

Although the above-mentioned embodiments are described by using the double-screen terminal as an example, the present application is not limited thereto. In addition to the double-screen terminal, a multi-screen terminal including more than three screens (such as a desktop with three or more screens) may also use the above-mentioned method to control screen backlight of at least two of the multiple screens.

Embodiment Four

Figure 10:
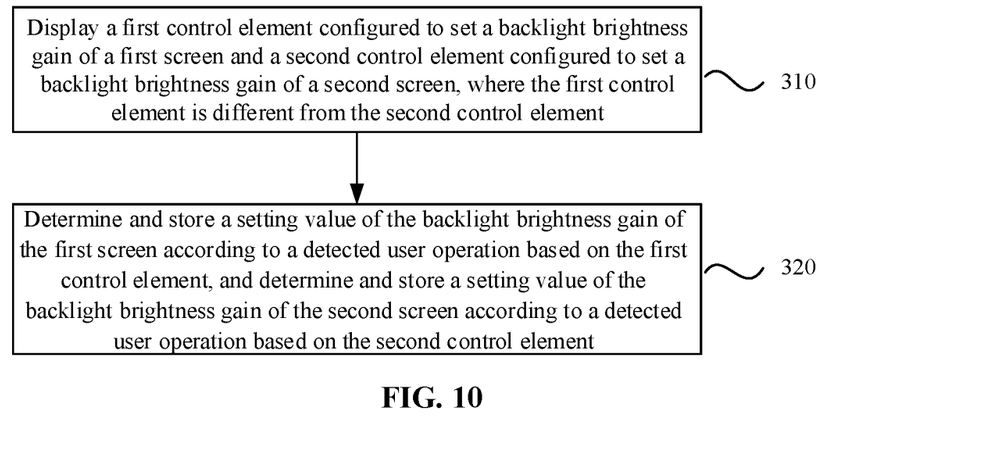
FIG. 10 is a flowchart of a method for setting screen backlight according to embodiment four of the present application.

This embodiment provides a method for setting screen backlight. As shown in FIG. 10, the method includes steps described below.

Step 310, a first control element configured to set a backlight brightness gain of a first screen and a second control element configured to set a backlight brightness gain of a second screen are displayed, where the first control element is different from the second control element.

In this embodiment, the first control element and the second control element are two different progress bars. However, in other embodiment, the backlight brightness gain of the first screen and the backlight brightness gain of the second screen may also be respectively set in a digital input manner and so on.

Step 320, a setting value of the backlight brightness gain of the first screen is determined and stored according to a detected user operation based on the first control element, and a setting value of the backlight brightness gain of the second screen is determined and stored according to a detected user operation based on the second control element.

In this embodiment, the first control element and the second control element are two different progress bars.

This embodiment further provides a device for setting screen backlight. The device for setting screen backlight may be implemented by software and/or hardware in a multi-screen terminal which are configured to implement screen backlight brightness gain setting. The device includes a display module and a setting module.

The display module is configured to display a first control element configured to set a backlight brightness gain of a first screen and a second control element configured to set a backlight brightness gain of a second screen, where the first control element is different from the second control element.

The setting module is configured to determine and store a setting value of the backlight brightness gain of the first screen according to a detected user operation based on the first control element, and determine and store a setting value of the backlight brightness gain of the second screen according to a detected user operation based on the second control element.

In this embodiment, the first control element and the second control element displayed by the display module are two different progress bars.

This embodiment further provides a multi-screen terminal, including a memory, a processor, and a computer program stored in the memory and executable on the processor, where the processor, when executing the computer program, implements the above-mentioned processing of the method according to this embodiment.

Through the above embodiments, a user can set the backlight brightness gain of the first screen and the backlight brightness gain of the second screen respectively to satisfy individual adjustment requirements. For example, a backlight brightness gain of a secondary screen is set as a negative value, so that backlight brightness of the secondary screen is adjusted to be darker to satisfy power saving requirements. It should be understood by those skilled in the art that functional modules/units in all or part of the steps of the method, the system and the device disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be executed jointly by several physical components. Some or all physical components may be implemented as software executed by processors such as central processing units, digital signal processors or microcontrollers, hardware, or integrated circuits such as dedicated integrated circuits. Such software may be distributed on a computer-readable medium, which may include a computer storage medium (or a non-transitory medium) and a communication medium (or a transitory medium). As is known to those skilled in the art, the computer storage medium includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storage, a magnetic cassette, a magnetic tape, a magnetic disk storage or other magnetic storage devices, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

INDUSTRIAL APPLICABILITY

The method and device for controlling screen backlight, the method and device for setting screen backlight, and the multi-screen terminal provided by the present disclosure can set backlight brightness gains of different screens respectively to satisfy individual requirements of users and the display effect is improved.

What is claimed is:

1. A method for controlling screen backlight, comprising:
determining a basic setting value V0, wherein the basic setting value V0 is a value, which is set for backlight brightness of a first screen and backlight brightness of a second screen;
performing at least one correction based on the basic setting value V0 for each of the first screen and the second screen, serving a correction value of the backlight brightness of the first screen obtained by a last correction as a setting value V1 of the backlight brightness of the first screen, and serving a correction value of the backlight brightness of the second screen obtained by a last correction as a setting value V2 of the backlight brightness of the second screen; and
adjusting the backlight brightness of the first screen according to the setting value V1, and adjusting the backlight brightness of the second screen according to the setting value V2;
wherein performing the at least one correction based on the basic setting value V0 for each of the first screen and the second screen comprises: performing a first correction on each of the first screen and the second screen based on the basic setting value V0;
wherein the method further comprises:
performing at least one correction on each of the first screen and the second screen after performing the first correction on each of the first screen and the second screen based on the basic setting value V0; wherein performing the at least one correction on each of the first screen and the second screen comprises:
determining, according to use duration T1 of the first screen and use duration T2 of the second screen, a loss difference $\Delta v$ between the backlight brightness of the first screen and the backlight brightness of the second screen as $\Delta v = \Delta v1 - \Delta v2$, wherein $\Delta v1$ is a loss value of the backlight brightness of the first screen, and $\Delta v2$ is a loss value of the backlight brightness of the second screen; and calculating a correction value V1r' of the backlight brightness of the first screen and a correction value V2r' of the backlight brightness of the second screen such that V1r'−V2r'=V1pre+Δv−V2pre, wherein V1pre is a correction value of the backlight brightness of the first screen after a previous correction, and V2pre is a correction value of the backlight brightness of the second screen after the previous correction.

2. The method of claim 1, wherein performing the first correction on each of the first screen and the second screen based on the basic setting value V0 comprises:
calculating, according to the basic setting value V0, a backlight lumen characteristic of the first screen, and a backlight lumen characteristic of the second screen, a correction value V1c and a correction value V2c, such that the backlight brightness of the first screen in a case where a setting value of the backlight brightness of the first screen is the correction value V1c is consistent with the backlight brightness of the second screen in a case where a setting value of the backlight brightness of the second screen is the correction value V2c, wherein the correction value V1c is a correction value of the backlight brightness of the first screen after the first correction, and the correction value V2c is a correction value of the backlight brightness of the second screen after the first correction.

3. The method of claim 2, wherein calculating, according to the basic setting value V0, the backlight lumen characteristic of the first screen, and the backlight lumen characteristic of the second screen, the correction value V1c and the correction value V2c comprises one of:
serving the basic setting value V0 as the correction value Vic, determining the backlight brightness of the first screen corresponding to the basic setting value V0 according to the backlight lumen characteristic of the first screen, and serving a setting value of the backlight brightness of the second screen corresponding to the backlight brightness of the first screen as the correction value V2c according to the backlight lumen characteristic of the second screen;
serving the basic setting value V0 as the correction value V2c, determining the backlight brightness of the second screen corresponding to the basic setting value V0 according to the backlight lumen characteristic of the second screen, and serving a setting value of the backlight brightness of the first screen corresponding to the backlight brightness of the second screen as the correction value V1c according to the backlight lumen characteristic of the first screen; or
determining backlight brightness of a standard screen corresponding to the basic setting value V0 according to a backlight lumen characteristic of the standard screen, serving a setting value of the backlight brightness of the first screen corresponding to the backlight brightness of the standard screen as the correction value V1c according to the backlight lumen characteristic of the first screen, and serving a setting value of the backlight brightness of the second screen corresponding to the backlight brightness of the standard screen as the correction value V2c according to the backlight lumen characteristic of the second screen.

4. The method of claim 1, wherein performing the first correction on each of the first screen and the second screen based on the basic setting value V0 comprises:
determining, according to use duration T1 of the first screen and use duration T2 of the second screen, a loss difference Δv between the backlight brightness of the first screen and the backlight brightness of the second screen as Δv=Δv1−Δv2, wherein Δv1 is a loss value of the backlight brightness of the first screen, and Δv2 is a loss value of the backlight brightness of the second screen; and
calculating a correction value V1r of the backlight brightness of the first screen and a correction value V2r of the backlight brightness of the second screen, such that V1r−V2r=V0+Δv−V0.

5. The method of claim 4, wherein Δv1 and Δv2 are obtained by:
calculating the use duration T1 of the first screen and a weighted average value PWB1 of the backlight brightness of the first screen according to use duration and a setting value of the backlight brightness of the first screen in each operation;
calculating, according to a correspondence between use duration and a brightness loss of the first screen under at least one setting value of the backlight brightness, the loss value Δv1 of the backlight brightness of the first screen in a case where the setting value of the backlight brightness of the first screen is the weighted average value PWB1 and the use duration is T1;
calculating the use duration T2 of the second screen and a weighted average value PWB2 of the backlight brightness of the second screen according to use duration and a setting value of the backlight brightness of the second screen in each operation; and
calculating, according to a correspondence between use duration and a brightness loss of the second screen under at least one setting value of the backlight brightness, the loss value Δv2 of the backlight brightness of the second screen in a case where the setting value of the backlight brightness of the second screen is the weighted average value PWB2 and the use duration is T2.

6. The method of claim 1, wherein performing the first correction on each of the first screen and the second screen based on the basic setting value V0 comprises:
adding v1 to the basic setting value V0 to obtain a correction value of the backlight brightness of the first screen, and adding v2 to the basic setting value V0 to obtain a correction value of the backlight brightness of the second screen;
wherein v1 is a backlight brightness gain of the first screen, and v2 is backlight brightness gain of the second screen, and v1 and v2 are set according to a user operation.

7. The method of claim 2, further comprising: performing at least one correction on each of the first screen and the second screen after performing the first correction on each of the first screen and the second screen based on the basic setting value V0;
wherein performing the at least one correction on each of the first screen and the second screen comprises:
adding v1 to a correction value V1pre' to obtain a correction value of the backlight brightness of the first screen, and adding v2 to a correction value V2pre' to obtain a correction value of the backlight brightness of the second screen;
wherein v1 is the backlight brightness gain of the first screen, v2 is the backlight brightness gain of the second screen, and v1 and v2 are set according to the user operation, and wherein V1pre' is a correction value of the backlight brightness of the first screen after a previous correction, and V2pre' is a correction value of the backlight brightness of the second screen after the previous correction.

8. A device for controlling screen backlight, comprising:

a basic value determination module, which is configured to determine a basic setting value V0, wherein the basic setting value V0 is a value, which is set for backlight brightness of a first screen and backlight brightness of a second screen;

a setting value determination module, which is configured to perform at least one correction based on the basic setting value V0 for each of the first screen and the second screen, serve a correction value of the backlight brightness of the first screen obtained by a last correction as a setting value V1 of the backlight brightness of the first screen, and serve a correction value of the backlight brightness of the second screen obtained by the last correction as a setting value V2 of the backlight brightness of the second screen; and a brightness adjustment module, which is configured to adjust the backlight brightness of the first screen according to the setting value V1, and adjust the backlight brightness of the second screen according to the setting value V2;

wherein the setting value determination module is configured to perform a first correction on each of the first screen and the second screen based on the basic setting value V0; and after performing the first correction on each of the first screen and the second screen based on the basic setting value V0, the setting value determination module is configured to perform at least one correction on the first screen and the second screen in a following way:

determining, according to use duration T1 of the first screen and use duration T2 of the second screen, a loss difference $\Delta v$ between the backlight brightness of the first screen and the backlight brightness of the second screen as $\Delta v = \Delta v1 - \Delta v2$, wherein $\Delta v1$ is a loss value of the backlight brightness of the first screen, and $\Delta v2$ is a loss value of the backlight brightness of the second screen; and calculating a correction value V1r' of the backlight brightness of the first screen and a correction value V2r' of the backlight brightness of the second screen such that V1r'−V2r'=V1pre+$\Delta v$−V2pre, wherein V1pre is a correction value of the backlight brightness of the first screen after a previous correction, and V2pre is a correction value of the backlight brightness of the second screen after the previous correction.

9. The device of claim 8, wherein the setting value determination module is configured to perform a first correction on each of the first screen and the second screen based on the basic setting value V0 in a following way:

calculating, according to the basic setting value V0, a backlight lumen characteristic of the first screen, and a backlight lumen characteristic of the second screen, a correction value V1c and a correction value V2c, such that the backlight brightness of the first screen in a case where a setting value of the backlight brightness of the first screen is the correction value V1c is consistent with the backlight brightness of the second screen in a case where a setting value of the backlight brightness of the second screen is the correction value V2c, wherein the correction value V1c is a correction value of the backlight brightness of the first screen after the first correction, and the correction value V2c is a correction value of the backlight brightness of the second screen after the first correction.

10. The device of claim 8, wherein the setting value determination module is configured to perform the first correction on each of the first screen and the second screen based on the basic setting value V0 in a following way:

determining, according to use duration T1 of the first screen and use duration T2 of the second screen, a loss difference $\Delta v$ between the backlight brightness of the first screen and the backlight brightness of the second screen as $\Delta v = \Delta v1 - \Delta v2$, wherein $\Delta v1$ is a loss value of the backlight brightness of the first screen, and $\Delta v2$ is a loss value of the backlight brightness of the second screen; and calculating a correction value V1r of the backlight brightness of the first screen and a correction value V2r of the backlight brightness of the second screen, such that V1r−V2r=V0+$\Delta v$−V0.

11. A multi-screen terminal, comprising a memory, a processor, and a computer program stored in the memory and executable on the processor, wherein the processor, when executing the computer program, implements the method of claim 1.

12. A non-transitory computer-readable storage medium, which is configured to store a computer program which, when executed by a processor, implements the method of claim 1.

13. The method of claim 1, wherein $\Delta v1$ and $\Delta v2$ are obtained by:

calculating the use duration T1 of the first screen and a weighted average value PWB1 of the backlight brightness of the first screen according to use duration and a setting value of the backlight brightness of the first screen in each operation;

calculating, according to a correspondence between use duration and a brightness loss of the first screen under at least one setting value of the backlight brightness, the loss value $\Delta v1$ of the backlight brightness of the first screen in a case where the setting value of the backlight brightness of the first screen is the weighted average value PWB1 and the use duration is T1;

calculating the use duration T2 of the second screen and a weighted average value PWB2 of the backlight brightness of the second screen according to use duration and a setting value of the backlight brightness of the second screen in each operation; and calculating, according to a correspondence between use duration and a brightness loss of the second screen under at least one setting value of the backlight brightness, the loss value $\Delta v2$ of the backlight brightness of the second screen in a case where the setting value of the backlight brightness of the second screen is the weighted average value PWB2 and the use duration is T2.

14. A method for controlling screen backlight, comprising:

determining a basic setting value V0, wherein the basic setting value V0 is a value, which is set for backlight brightness of a first screen and backlight brightness of a second screen;

performing at least one correction based on the basic setting value V0 for each of the first screen and the second screen, serving a correction value of the backlight brightness of the first screen obtained by a last correction as a setting value V1 of the backlight brightness of the first screen, and serving a correction value of the backlight brightness of the second screen obtained by a last correction as a setting value V2 of the backlight brightness of the second screen; and adjusting the backlight brightness of the first screen according to the setting value V1, and adjusting the backlight brightness of the second screen according to the setting value V2;

wherein performing the at least one correction based on the basic setting value V0 for each of the first screen and the second screen comprises: performing a first correction on each of the first screen and the second screen based on the basic setting value V0; wherein performing the first correction on each of the first screen and the second screen based on the basic setting value V0 comprises:

determining, according to use duration T1 of the first screen and use duration T2 of the second screen, a loss difference $\Delta v$ between the backlight brightness of the first screen and the backlight brightness of the second screen as $\Delta v = \Delta v1 - \Delta v2$, wherein $\Delta v1$ is a loss value of the backlight brightness of the first screen, and $\Delta v2$ is a loss value of the backlight brightness of the second screen; and calculating a correction value V1$r$ of the backlight brightness of the first screen and a correction value V2$r$ of the backlight brightness of the second screen, such that V1$r$−V2$r$=V0+$\Delta v$−V0.

15. The method of claim 14, further comprising: performing at least one correction on each of the first screen and the second screen after performing the first correction on each of the first screen and the second screen based on the basic setting value V0;

wherein performing the at least one correction on each of the first screen and the second screen comprises:

determining, according to the use duration T1 of the first screen and the use duration T2 of the second screen, the loss difference $\Delta v$ between the backlight brightness of the first screen and the backlight brightness of the second screen as $\Delta v = \Delta v1 - \Delta v2$, wherein $\Delta v1$ is the loss value of the backlight brightness of the first screen, and $\Delta v2$ is the loss value of the backlight brightness of the second screen; and calculating a correction value V1$r$' of the backlight brightness of the first screen and a correction value V2$r$' of the backlight brightness of the second screen such that V1$r$'−V2$r$'=V1pre+$\Delta v$−V2pre, wherein V1pre is a correction value of the backlight brightness of the first screen after a previous correction, and V2pre is a correction value of the backlight brightness of the second screen after the previous correction.

16. The method of claim 14, wherein $\Delta v1$ and $\Delta v2$ are obtained by:

calculating the use duration T1 of the first screen and a weighted average value PWB1 of the backlight brightness of the first screen according to use duration and a setting value of the backlight brightness of the first screen in each operation;

calculating, according to a correspondence between use duration and a brightness loss of the first screen under at least one setting value of the backlight brightness, the loss value $\Delta v1$ of the backlight brightness of the first screen in a case where the setting value of the backlight brightness of the first screen is the weighted average value PWB1 and the use duration is T1;

calculating the use duration T2 of the second screen and a weighted average value PWB2 of the backlight brightness of the second screen according to use duration and a setting value of the backlight brightness of the second screen in each operation; and calculating, according to a correspondence between use duration and a brightness loss of the second screen under at least one setting value of the backlight brightness, the loss value $\Delta v2$ of the backlight brightness of the second screen in a case where the setting value of the backlight brightness of the second screen is the weighted average value PWB2 and the use duration is T2.

17. The method of claim 14, wherein performing the first correction on each of the first screen and the second screen based on the basic setting value V0 comprises:

calculating, according to the basic setting value V0, a backlight lumen characteristic of the first screen, and a backlight lumen characteristic of the second screen, a correction value V1$c$ and a correction value V2$c$, such that the backlight brightness of the first screen in a case where a setting value of the backlight brightness of the first screen is the correction value V1$c$ is consistent with the backlight brightness of the second screen in a case where a setting value of the backlight brightness of the second screen is the correction value V2$c$, wherein the correction value V1$c$ is a correction value of the backlight brightness of the first screen after the first correction, and the correction value V2$c$ is a correction value of the backlight brightness of the second screen after the first correction.

18. The method of claim 17, further comprising: performing at least one correction on each of the first screen and the second screen after performing the first correction on each of the first screen and the second screen based on the basic setting value V0;

wherein performing the at least one correction on each of the first screen and the second screen comprises:

adding v1 to a correction value V1pre' to obtain a correction value of the backlight brightness of the first screen, and adding v2 to a correction value V2pre' to obtain a correction value of the backlight brightness of the second screen;

wherein v1 is the backlight brightness gain of the first screen, v2 is the backlight brightness gain of the second screen, and v1 and v2 are set according to the user operation, and wherein V1pre' is a correction value of the backlight brightness of the first screen after a previous correction, and V2pre' is a correction value of the backlight brightness of the second screen after the previous correction.

19. The method of claim 14, after adjusting the backlight brightness of the first screen according to the setting value V1, and adjusting the backlight brightness of the second screen according to the setting value V2, further comprising:

in a case of a difference between the backlight brightness of the first screen and the backlight brightness of the second screen being non-zero, performing one of the following operations:

calibrating the backlight brightness of the first screen and the backlight brightness of the second screen according to an upper brightness curve between the first screen and the second screen;

calibrating the backlight brightness of the first screen and the backlight brightness of the second screen according to a lower brightness curve between the first screen and the second screen; or calibrating the backlight brightness of the first screen and the backlight brightness of the second screen according to a pre-configured brightness curve of a standard screen.

20. The method of claim 1, after adjusting the backlight brightness of the first screen according to the setting value V1, and adjusting the backlight brightness of the second screen according to the setting value V2, further comprising:
in a case of a difference between the backlight brightness of the first screen and the backlight brightness of the second screen being non-zero, performing one of the following operations:
calibrating the backlight brightness of the first screen and the backlight brightness of the second screen according to an upper brightness curve between the first screen and the second screen;
calibrating the backlight brightness of the first screen and the backlight brightness of the second screen according to a lower brightness curve between the first screen and the second screen; or
calibrating the backlight brightness of the first screen and the backlight brightness of the second screen according to a pre-configured brightness curve of a standard screen.

* * * * *